United States Patent [19]

Wamprecht et al.

[11] Patent Number: 5,521,250
[45] Date of Patent: May 28, 1996

[54] POWDER COATING COMPOSITIONS AND THEIR USE FOR THE PRODUCTION OF COATINGS

[75] Inventors: Christian Wamprecht, Neuss; Hans-Ulrich Meier-Westhues, Leverkusen; Jürgen Meixner, Krefeld; Lothar Kahl, Bergisch Gladbach, all of Germany

[73] Assignee: Bayer Aktiengesellschaft, Leverkusen, Germany

[21] Appl. No.: 503,054

[22] Filed: Jul. 17, 1995

[30] Foreign Application Priority Data

Jul. 25, 1994 [DE] Germany ................. 44 26 333.3

[51] Int. Cl.⁶ ............... C09D 137/00; C09D 125/14
[52] U.S. Cl. ............... 525/130; 525/127; 525/176; 525/327.3; 526/271; 526/272; 428/413; 428/418
[58] Field of Search .................. 526/271, 272; 525/127, 130, 176, 327.3; 428/413, 418

[56] References Cited

U.S. PATENT DOCUMENTS

| | | | |
|---|---|---|---|
| 3,730,930 | 5/1973 | Labana | 260/23 EP |
| 3,752,870 | 8/1973 | Labana | 260/836 |
| 3,781,379 | 12/1973 | Theodore et al. | 260/836 |
| 3,781,380 | 12/1973 | Labana | 260/836 |
| 3,888,943 | 6/1975 | Labana et al. | 260/836 |
| 3,914,333 | 10/1975 | Labana et al. | 260/836 |
| 3,919,345 | 11/1975 | Labana et al. | 260/830 R |
| 3,932,367 | 1/1976 | Labana et al. | 260/78.4 D |
| 3,959,405 | 5/1976 | Labana et al. | 260/836 |
| 3,976,715 | 8/1976 | Labana et al. | 260/836 |
| 3,976,716 | 8/1976 | Labana et al. | 260/836 |
| 3,976,717 | 8/1976 | Labana et al. | 260/836 |
| 3,976,718 | 8/1976 | Labana et al. | 260/836 |
| 3,976,719 | 8/1976 | Labana et al. | 260/836 |
| 3,991,132 | 11/1976 | Slwiec et al. | 260/836 |
| 3,998,905 | 12/1976 | Labana et al. | 260/836 |
| 4,006,200 | 2/1977 | Labana et al. | 260/836 |
| 4,044,070 | 8/1977 | Labana et al. | 260/836 |
| 4,065,518 | 12/1977 | Labana et al. | 260/836 |
| 4,069,275 | 1/1978 | Labana et al. | 260/836 |
| 4,091,048 | 5/1978 | Labana et al. | 260/836 |
| 4,346,144 | 8/1982 | Craven | 428/335 |
| 4,374,954 | 2/1983 | Labana et al. | 525/207 |
| 5,055,524 | 10/1991 | Pettit, Jr. et al. | 525/172 |

FOREIGN PATENT DOCUMENTS

| | | |
|---|---|---|
| 2064290 | 10/1992 | Canada . |
| 2064292 | 10/1992 | Canada . |
| 1424966 | 2/1976 | United Kingdom . |
| 1425690 | 2/1976 | United Kingdom . |
| 1438429 | 6/1976 | United Kingdom . |

Primary Examiner—David Buttner
Attorney, Agent, or Firm—Joseph C. Gil; Thomas W. Roy

[57] ABSTRACT

Powder coating compositions based on A) copolymers prepared from olefinically unsaturated monomers, containing epoxide and anhydride groups and having a glass transition temperature $T_g$ of 30° to 80° C., an average molecular weight $M_n$ of 1,000 to 6,000 and a molecular weight distribution $M_w/M_n$ of 2.5 to 10.0, B) a hardener component selected from (i) (cyclo)aliphatic dicarboxylic acids, (ii) anhydrides of such dicarboxylic acids, (iii) polyol-modified polymeric anhydrides of such dicarboxylic acids and (iv) aliphatic hydroxycarboxylic acids and optionally C) additional crosslinking agents in the form of polyaddition products having uretidione groups, and the use of these compositions for coating heat-resistant substrates.

14 Claims, No Drawings

POWDER COATING COMPOSITIONS AND THEIR USE FOR THE PRODUCTION OF COATINGS

BACKGROUND OF THE INVENTION

1. Field of the Invention

This invention relates to a novel powder coating composition based on copolymers having epoxide groups and cyclic carboxylic anhydride groups and acids or acid derivatives as the hardener and to the use of this powder coating composition for coating heat-resistant substrates, in particular for the production of automotive clear lacquers.

2. Description of the Prior Art

Powder coating compositions based on epoxy-/functional copolymers which contain carboxylic acids, in particular dicarboxylic acids or dicarboxylic anhydrides as the hardener are known and described in DE-AS 2,240,312, DE-AS 2,240,314, DE-OS 2,457,826 and U.S. Pat. No. 4,091,048.

Copolymers containing functional groups in addition to epoxide groups, for example hydroxyl, anhydride or amide groups, may also be used in the production of powder coating compositions (c.f. for example, DE-OS 2,441,624, DE-OS 2,441,752, DE-OS 2,441,753, DE-OS 2,457,827, DE-OS 2,457,894, DE-OS 2,509,410, U.S. Pat. No. 3,932, 367, U.S. Pat. No. 3,991,132 and U.S. Pat. No. 4,374,954).

The powder coating compositions described in these publications were developed in particular for automotive clear coats. However, the resulting coatings do not completely fulfil the current property requirements with regard to resistance to solvents and chemicals.

There have been many attempts to improve the inadequate solvent resistance of powder coating compositions based on epoxy-functional polyacrylates and dicarboxylic acids or the mono- or polyanhydrides thereof. EP-A 0,299,420 thus describes diol- or polyol-modified polyanhydride crosslinking agents based on aliphatic dicarboxylic acids having 3 to 20 carbon atoms. Corresponding powder coating compositions with epoxy-functional polyacrylates as the binder yield lacquer films with good levelling properties, but which do not have the requisite resistance to solvents and chemicals at the low baking temperatures of approximately 140° C. which are required in practice.

EP-A 0,509,392 and EP-A 0,509,393 describe powder coating compositions based on epoxy-functional copolymers and aliphatic or cycloaliphatic dicarboxylic acids, the anhydrides thereof or polyol-modified anhydrides. An essential feature of the invention in each case is the low baking temperature of 120° C. which may be achieved. The low baking temperature is apparently attributable to the fact that the epoxy-functional copolymer contains 5 to 50 wt. % of tert.-butyl acrylate or tert.-butyl methacrylate in EP-A 0,509, 392, and 35 to 50 wt. % of styrene in EP-A 0,509,393.

U.S. Pat. No. 4,346,144 describes powder coating compositions prepared from A) epoxy-functional copolymers, B) aliphatic dicarboxylic acids having 8 to 18 carbon atoms as the crosslinking-agent and C) an additional crosslinking component which may react with hydroxyl or carboxyl groups, such as alkylated melamine/formaldehyde resins, alkylated glycoluril resins, aliphatic glycidyl ethers and cycloaliphatic diepoxides. Blocked polyisocyanates are also mentioned as additional crosslinking substances in the specification and several examples.

For environmental reasons it is desirable to provide coatings which are completely free of emissions, e.g., solvents or the blocking agents released when the blocked polyisocyanates are heated to their deblocking temperature.

An object of the present invention is to provide a novel powder coating composition which does not suffer the disadvantages of the prior art, i.e., which may be hardened at temperatures of below 160° C. to yield a smooth, elastic coating that has improved gloss and is resistant to solvents and chemicals.

This object may be achieved with the powder coating composition according to the invention which is described in greater detail below. The novel powder coating composition is characterized by its specific composition and the specific molecular structure of the polyacrylate component A) used as the main component, which has both epoxide and cyclic carboxylic anhydride groups.

DE-OS 2,509,410 describes similar, but not identical, powder coating compositions. The differences reside in particular in the proportion of epoxy-functional monomers (maximum 25 wt. %), the composition of the non-functional monomers and the molecular weight distribution ($M_w/M_n$= 1.6 to 3.0, preferably 1.7 to 2.2) of the copolymers which have epoxy and anhydride groups.

SUMMARY OF THE INVENTION

The present invention relates to a powder coating composition, which is suitable for the production of tough, resilient, non-yellowing coatings that are resistant to solvents and chemicals and may be hardened at temperatures of at least 120° C., wherein the composition contains A) a copolymer component containing one or more copolymers containing epoxide and anhydride groups and having a glass transition temperature $T_g$ of 30° to 80° C., a number average molecular weight ($M_n$) of 1,000 to 6,000 and a molecular weight distribution, measured as the ratio of the weight average molecular weight to the number average molecular weight ($M_w/M_n$), of 2.5 to 10.0, wherein the copolymer is prepared from (i) 4 to 50 parts by weight of (cyclo)alkyl, aryl and/or aralkyl esters of olefinically unsaturated mono- and/or dicarboxylic acids having 1 to 18 carbon atoms in the alcohol or phenol residue, (ii) 26 to 45 parts by weight of glycidyl acrylate and/or glycidyl methacrylate, (iii) 1 to 8 parts by weight of maleic anhydride and/or itaconic anhydride and (iv) 20 to 69 parts by weight of vinyl aromatics, wherein the sum of the parts by weight of (i) to (iv) is 100, B) a hardener component having a melting point or range of 40° to 160° C. and containing one or more compounds selected from (i) (cyclo)aliphatic dicarboxylic acids having 4 to 20 carbon atoms, (ii) monomeric and/or polymeric anhydrides of such dicarboxylic acids, (iii) polyol-modified polymeric anhydrides of such dicarboxylic acids and (iv) aliphatic hydroxycarboxylic acids having 4 to 18 carbon atoms and C) optionally one or more crosslinking agents in the form of polyaddition products having uretdione groups, wherein components A) and B) are present in an amount such that there are 0.5 to 1.5 carboxyl and/or anhydride groups of component B) for each epoxide group of component A).

The present invention also provides the use of this powder coating composition for the production of coatings on any desired heat-resistant substrates, in particular in the production of automotive clear lacquers.

DETAILED DESCRIPTION OF THE INVENTION

Binder component A) is selected from copolymers prepared from olefinically unsaturated compounds and having cyclic anhydride groups in addition to epoxide groups. The epoxy equivalent weight of the copolymers is 284 to 546 g/mol, preferably 305 to 536 g/mol and more preferably 320 to 526 g/mol. The anhydride equivalent weight (calculated as $C_4H_2O_3$) of the copolymers is 1,225 to 9,800 g/mol, preferably 1,400 to 9,800 g/mol and more preferably 1,633 to 9,800 g/mol.

The copolymers used in binder component A) have a glass transition temperature $T_g$ of 30° to 80° C., preferably of 35° to 75° C. and a number average molecular weight ($M_n$) of 1,000 to 6,000, preferably 1,000 to 3,000 and particularly preferably 1,000 to 2,600. The molecular weight distribution, measured as the ratio ($M_w/M_n$) of the weight average molecular weight, $M_w$, to the number average molecular weight, $M_w$, is 2.5 to 10.0, preferably 3.0 to 9.5 and more preferably 3.5 to 9.0. These molecular weights, $M_w$ and $M_n$, are determined by gel permeation chromatography using polystyrene as the standard.

The copolymers present in component A) are prepared from (i) 4 to 50 parts by weight, preferably 7.5 to 45 parts by weight and more preferably 10 to 40 parts by weight of (cyclo)alkyl esters of olefinically unsaturated mono- and/or dicarboxylic acids having 1 to 18 carbon atoms in the (cyclo)alkyl residue, (ii) 26 to 45 parts by weight, preferably 26.5 to 42 parts by weight and more preferably 27 to 40 parts by weight of glycidyl acrylate and/or glycidyl methacrylate, (iii) 1 to 8 parts by weight, preferably 1 to 7 parts by weight and more preferably 1 to 6 parts by weight of maleic anhydride and/or itaconic anhydride and (iv) 20 to 69 parts by weight, preferably 22 to 65 parts by weight and more preferably 25 to 62 parts by weight of vinyl aromatics, wherein the sum of the parts by weight of (i) to (iv) is 100.

Monomers (i) include (cyclo)alkyl esters, or less preferably, aryl and/or aralkyl esters of acrylic or methacrylic acid having 1 to 18, preferably 1 to 9 carbon atoms in the alcohol or phenol residue, i.e., in the present case in the (cyclo)alkyl residue or, less preferably, in the aryl or aralkyl residue. Examples of these monomers include methyl (meth)acrylate, ethyl (meth)acrylate, n-propyl (meth)acrylate, isopropyl (meth)acrylate, n-butyl (meth)acrylate, isobutyl (meth)acrylate, tert.-butyl (meth)acrylate, 2-ethylhexyl (meth)acrylate, neopentyl (meth)acrylate, stearyl methacrylate and other esters of (meth)acrylic acid such as the cyclohexyl, isobornyl and 3,3,5-trimethylcyclohexyl esters. Also suitable are the maleic acid or fumaric acid di(cyclo)alkyl esters having 1 to 18, preferably 1 to 9 carbon atoms in the (cyclo)alkyl residues. Examples of these esters include maleic acid dimethyl ester, maleic acid diethyl ester, maleic acid diisopropyl ester, maleic acid diisobutyl ester, maleic acid di-tert.-butyl ester, maleic acid dicyclohexyl ester and the corresponding fumaric acid di(cyclo)alkyl esters.

Monomers (iv) are vinyl aromatics such as styrene, vinyltoluene or α-methylstyrene.

When producing the copolymers present in component A), it is possible to use any desired mixtures of monomers (i) to (iv) within the above-stated quantity limits, provided that the copolymers have epoxy group contents, anhydride group contents, glass transition temperatures and molecular weights within the previously disclosed ranges.

These conditions, which are essential to the usefulness of the copolymers according to the invention, are satisfied by using for the production of the copolymers a suitable ratio of "plasticizing" monomers, which lead to a reduction in the glass transition temperature of the copolymers, to "hardening" monomers, which lead to an increase in the glass transition temperature.

"Plasticizing" monomers include alkyl esters of acrylic acid, such as ethyl acrylate, n-butyl acrylate, isobutyl acrylate and 2-ethylhexyl acrylate.

"Hardening" monomers include alkyl esters of methacrylic acid such as methyl methacrylate, ethyl methacrylate, isobutyl methacrylate, cyclohexyl methacrylate, isopropyl methacrylate, tert.-butyl methacrylate, neopentyl methacrylate, isobornyl methacrylate and 3,3,5-trimethylcyclohexyl methacrylate; and vinyl aromatics such as styrene, vinyltoluene and α-ethylstyrene.

Copolymers A) are produced by free-radical initiated copolymerization of the previously disclosed monomers in suitable organic solvents. The monomers are copolymerized at temperatures of 60° to 200° C., preferably 80° to 180° C., in the presence of free-radical initiators and optionally chain-transfer agents.

The copolymers are preferably produced in inert organic solvents. Suitable solvents include aromatic solvents, such as toluene or xylene; esters such as ethyl acetate, butyl acetate or methoxypropyl acetate; ketones such as acetone, methyl ethyl ketone or methyl isobutyl ketone; and mixtures of these solvents.

The copolymers may be produced continuously or discontinuously. The monomer mixture and the initiator are customarily uniformly and continuously introduced into a polymerization reactor and, simultaneously, the corresponding quantity of polymer is continuously discharged. Copolymers which are virtually chemically uniform may be produced in this manner. Copolymers which are virtually chemically uniform may also be produced by introducing the reaction mixture into a stirred tank at a constant rate without discharging the polymer.

It is also possible to initially introduce a proportion of the monomers into the reactor, preferably maleic acid di(cyclo)alkyl esters and maleic anhydride mixed with the disclosed solvents, and to introduce the remaining monomers and additives separately or together into the initially introduced monomers at the reaction temperature. Polymerization generally proceeds at atmospheric pressure, but may be performed at pressures of up to 25 bar. The initiators are used in quantities of 0.05 to 12 wt. %, preferably of 0.1 to 10 wt. %, based on the weight of the monomers.

Suitable initiators are the known free-radical initiators and include aliphatic azo compounds such as azodiisobutyronitrile, azo-bis-2-methylvaleronitrile, 1,1'-azo-bis- 1-cyclohexanenitrile and 2,2'-azo-bis-isobutyric acid alkyl esters; symmetrical diacyl peroxides such as acetyl/propionyl or butyryl peroxide, benzoyl peroxides substituted with bromine, nitro, methyl or methoxy groups and lauryl peroxides; symmetrical peroxydicarbonates such as diethyl, diisopropyl, dicyclohexyl and dibenzoyl peroxydicarbonate; tert.-butylperoxy-2-ethylhexanoate; tert.-butylperbenzoate; hydroperoxides such as tert.-butyl-hydroperoxide and cumene hydroperoxide; and dialkyl peroxides such as dicumyl peroxide, tert.-butylcumylperoxide or di-tert.-butylperoxide.

Customary regulators may be used to regulate the molecular weight of the copolymers. Examples include tert.-dodecylmercaptan, n-dodecylmercaptan and mercaptoethanol. The regulators may be added in an amount of 0.1 to 8 wt. %, preferably 0.1 to 4 wt. %, based on the total weight of the monomers.

The resulting organic solutions of the copolymers may be isolated as ready-to-use solids having the previously disclosed glass transition temperature and content of functional groups by removing the solvent. The solvent or solvent mixture is removed as completely as possible, generally to a residual content of $\leq 2$ wt. %, preferably $\leq 1$ wt. %, for example by spray drying, degassing in vented extruders or distillation, optionally under a vacuum.

When degassing in a vented extruder or distillation, the copolymers are present in the form of viscous hot melts which may readily be stirred at temperatures of $\geq 100°$ C. and which are pelletized once they have cooled and solidified.

Hardener component B) is selected from (i) aliphatic and/or cycloiliphatic dicarboxylic acids having 4 to 20 carbon atoms, (ii) monomeric or polymeric anhydrides of such acids, (iii) polyol-modified, polymeric anhydrides of such acids and (iv) hydroxycarboxylic acids, which are preferably used only when mixed with anhydrides (ii) and/or (iii).

Dicarboxylic acid (i) include maleic acid, glutaric acid, adipic acid, pimelic acid, suberic acid, azelaic acid, dodecanedioic acid (1,10-decanedicarboxylic acid) or 1,12-dodecanedicarboxylic acid.

Monomeric anhydrides (ii) include succinic, maleic, glutaric or hexahydrophthalic anhydride. Polymeric anhydrides (ii) include those which may be obtained by the intramolecular condensation of the stated acids or a mixture thereof. Examples include adipic acid (poly)anhydride, azelaic acid (poly)anhydride, sebacic acid (poly)anhydride and dodecanedioic acid (poly)anhydride. The weight average molecular weight ($M_w$, determined by gel permeation chromatography using polystyrene as the standard) of these polyanhydrides is generally 600 to 5,000. The polyanhydrides are produced, for example, by reacting the dicarboxylic acids or dicarboxylic acid mixtures with acetic anhydride at a temperature of 120° to 200° C., preferably 120° to 170° C. The acetic acid eliminated during this reaction is removed, for example, by vacuum distillation.

Polyol-modified anhydrides (iii) are preferably those as may be obtained according to EP-A 0,299,420 (U.S. Pat. No. 5,055,524, herein incorporated by reference). The molar ratio of anhydride groups to carboxyl groups in these polyol-modified polyanhydrides is generally 0.04:1 to 5:1, preferably 1:1 to 3:1.

Suitable hydroxycarboxylic acids are preferably those which have a melting point of 40° to 150° C. These include 2-hydroxyisobutyric acid (81° C.), 2-hydroxyhexanoic acid (61° C.), 10-hydroxydecanoic acid (76° C.), 12-hydroxydodecanoic acid (86° C.), 16-hydroxyhexadecanoic acid (98° C.) and 12-hydroxy-octadecanoic acid (80° C.).

These hydroxycarboxylic acids are preferably used only in combination with polyanhydrides (ii) or (iii), preferably (ii), in quantities of at most 50 wt. %, based on the weight of the polyanhydrides.

Especially preferred hardener components B) are based solely on dicarboxylic acids (i) or monomeric or polymeric anhydrides (ii).

Hardener component B) is used in quantities such that the total molar ratio of carboxyl and/or anhydride groups of the hardener component to epoxide groups is 0.5:1 to 1.5:1, preferably 0.8:1 to 1.2:1.

Optional hardener component C) is selected from polyaddition compounds having uretidione groups and based on aliphatic and/or cycloaliphatic diisocyanates, in particular 1,6-hexamethylene diisocyanate (HDI), 1-isocyanato-3,3,5-trimethyl-5-isocyanatomethylcyclohexane (isophorone diisocyanate or IPDI), 4,4'-diisocyanatodicyclohexylmethane and mixtures of these diisocyanates.

The production of such polyaddition compounds by reacting polyisocyanates having uretidione groups with isocyanate-reactive difunctional and optionally monofunctional compounds, in particular mono- or dihydric alcohols optionally having ester groups, is known in principle and is described, for example, in DE-OS 2,420,475, EP-A 0,045,996, EP-A 0,045,998 (U.S. Pat. Nos. 4,044,171, 4,483,798 and 4,463,154, herein incorporated by reference). The polyaddition compounds having uretidione groups preferably have a uretidione group content (calculated as $C_2N_2O_2$, molecular weight=84) of 3 to 16 wt. % and a melting point of 40° to 125° C.

Optional hardener component C) is used in the powder coating composition according to the invention in quantities such that there are 0.1 to 1.2, preferably 0.2 to 1.0, uretidione groups for each epoxide group of component A).

Optional additives D) include catalysts such as tin(II) hexanoate, tin(II) octoate, tin(II) laurate, dibutyltin oxide, dibutyltin chloride, dibutyltin diacetate, dibutyltin dilaurate, dibutyltin maleate, dioctyltin diacetate, 1,4-diazabicyclo(2, 2,2)octane, 1,5-diaza-bicyclo(4,3,0)non-5-ene, 1,8-diazabicyclo-(5,4,0)undec-7-ene and mixtures of these catalysts. Additional examples of suitable catalysts and details relating to their mode of action are described in Kunststoffhandbuch, volume VII, edited by Vieweg & Höchtlen, Carl-Hanser Verlag, Munich 1966, for example on pages 96 to 102. The catalysts are used, if at all, in amounts of 0.1 to 5 wt. %, preferably of 0.1 to 3 wt. %, based on the weight of components A), B) and C).

Other optional additives D) include levelling agents such as polybutyl acrylate and those based on polysilicones; light stabilizers such as sterically hindered amines; UV absorbers such as benzotriazoles and benzophenones; pigments such as titanium dioxide; extenders such as barium sulphate.

Also suitable as additives D) are color stabilizers to counter the anger of yellowing due to overbaking. Suitable compounds include trialkyl and/or triaryl phosphites optionally having inert substituents, such as triethyl phosphite, triphenyl phosphite and preferably tris-alkylphenyl phosphites in which the alkyl substituents have 6 to 12 carbon atoms. Tris-nonylphenyl phosphite (technical grade product, substantially based on a phosphorous acid ester with the addition product of tripropylene on phenol) is particularly preferred.

Ready-to-use powder coating compositions may be produced by mixing together the individual components once they have been convened to powder form. In such a case, the individual powder particles would consist of the individual components A), B) and optionally C) and D). However, according to the preferred method of producing the powder coating compositions, components A), B) and optionally C) and D) are intimately mixed and combined into a homogeneous material, for example,in extruders or kneaders at temperatures above the melting range of the individual components, for example at 70° to 120° C. The solid obtained once the melt has solidified is then ground and the grain fractions above the desired grain size, for example above 0.1 mm, are removed by screening. In this manner, "mixed powders" are obtained in which each individual powder particle contains the individual components A), B) and optionally C) and D). The sequence in which the individual components A) to D) is not critical to the invention.

As previously disclosed, the individual components A), B) and optionally C) are used in amounts such that there are 0.5 to 1.5, preferably 0.8 to 1.2 carboxyl and/or anhydride groups of component B) and 0.1 to 1.2, preferably 0.2 to 1.0 uretidione groups of component C) for each epoxide group of component A).

The solvent and other volatile constituents, i.e., residual monomers or the cleavage products of the initiators, were then removed by vacuum distillation. The hot melt was then discharged into sheet aluminum dishes and mechanically comminuted once cool. Table I shows the composition and characteristic data of the resultant copolymers A).

TABLE I

| Composition and characteristic data of the copolymers A), quantities stated in g) | | | | | | | |
|---|---|---|---|---|---|---|---|
| Copolymer | $A_1$ | $A_2$ | $A_3$ | $A_4$ | $A_5$ | $A_6$ | $A_7$ |
| Part I | | | | | | | |
| Butyl acetate | 975 | 975 | 70 | 70 | 70 | 70 | 70 |
| Maleic acid dimethyl ester | | | | 350 | 740 | | |
| Maleic acid diethyl ester | | | 740 | | | 700 | 700 |
| Part II | | | | | | | |
| Glycidyl methacrylate | 716 | 716 | 959 | 1008 | 959 | 1225 | 1225 |
| Methyl methacrylate | 666 | 785 | 168 | 917 | 168 | 131 | 117 |
| Styrene | 596 | 715 | 1464 | 917 | 1424 | 1356 | 1323 |
| Butyl acrylate | 238 | | | | | | |
| Maleic anhydride | 119 | 119 | 135 | 168 | 175 | 53 | 100 |
| Part III | | | | | | | |
| Di-tert.-butyl peroxide | | | | 34 | 140 | 34 | 35 | 35 |
| Tert.-butylperoxy-2-ethyl hexanoate 70% in isododecane | 214 | 214 | | | | | |
| Butyl acetate | 76 | 76 | 30 | 30 | 30 | 30 | 30 |
| Polymerization temperature, °C. | 125 | 125 | 175 | 160 | 175 | 175 | 175 |
| Solids content, % | 99.2 | 99.8 | 99.4 | 99.6 | 99.6 | 99.2 | 99.3 |
| Epoxy equivalent weight, g/mol | 493 | 493 | 518 | 493 | 518 | 405 | 405 |
| Anhydride equivalent weight, g/mol | 2046 | 2046 | 2540 | 2042 | 1960 | 6472 | 3430 |
| $M_n$ | 5221 | 5219 | 2590 | 1802 | 1960 | 2306 | 2343 |
| $M_w/M_n$ | 3.78 | 3.22 | 4.50 | 7.92 | 6.59 | 3.81 | 4.18 |

The powder coating compositions produced in this manner may be applied onto the substrates to be coated using known powder application processes, such as electrostatic powder spraying or fluidized bed coating. The coatings are hardened by being heated to temperatures of 120° to 200° C., preferably of 130° to 150° C., for a period of 10 to 60 minutes, preferably of 20 to 40 minutes. The coatings obtained are hard, clear, level, glossy and elastic and have outstanding corrosion protection characteristics, i.e., very good resistance to solvents and chemicals, in particular resistance to acetone, even at low baking temperatures of 140° to 150° C. for 30 minutes.

Any desired heat-resistant substrates may be coated according to the invention such as glass, metals, wood or plastics. The powder coating compositions according to the invention are preferably used for the production of coatings on automotive bodywork, in particular for the production of automotive clear coats.

Unless otherwise stated, the parts and percentages given in the following examples are by weight.

EXAMPLES

I. General procedure for the production of copolymers A containing epoxide and anhydride groups Part I was introduced into a 5 liter stainless steel pressure reactor and heated to the desired polymerization temperature. Separate inlets were then used to introduce the other constituents together, beginning with part II (monomer mixture), which was added incrementally over a period of 1.5 hours, and part III (initiator), which was added incrementally over a period of 1.75 hours. Stirring was then continued for 0.5 hours at the polymerization temperature.

II—Comparison polymers $V_1$ to $V_4$ $V_1$: An epoxy-functional copolymer having an epoxide equivalent weight of approximately 535 g/mol and a number average molecular weight ($M_n$) of 2,775 g/mol, $M_w/M_n=2.51$, (Almatex PD 7610, a commercial product of Mitsui Toatsu).

$V_2$: An epoxy-functional copolymer prepared by repeating example A of EP-A 299,420 A2 (U.S. Pat. No. 5,055,524); epoxy equivalent weight: approximately 380 g/mol.

$V_3$: A copolymer containing epoxide and anhydride groups prepared by repeating example 1 of DE-OS 2,509,410 (U.S. Pat. No. 3,919,345); epoxy equivalent weight: approximately 950 g/mol; anhydride equivalent weight: approximately 1,400 g/mol.

$V_4$: A copolymer containing epoxide and anhydride groups prepared by repeating example 7 of DE-OS 2,509,410 (U.S. Pat. No. 3,919,345); epoxy equivalent weight: approximately 570 g/mol; anhydride equivalent weight: approximately 820 g/mol.

III—Carboxy-functional and/or anhydride-functional crosslinking agent B) Polyanhydride crosslinking agent B1:

988 g of 1,10-decanedicarboxylic acid and 308 g of acetic anhydride were weighed out into a 3 liter, three-necked flask fitted with a stirrer, distillation apparatus and thermometer and heated to 150° C. The liberated acetic acid was distilled off. During distillation the temperature was raised to 170° C. and the acetic acid completely distilled off by additionally applying a vacuum. The temperature was then reduced to 100° C. and the still liquid product was poured into a sheet aluminum dish to cool. and solidify. A solid with a melting point of 85° C. was obtained; anhydride and carboxylic equivalent weight: approximately 160 g/mol.

Dicarboxylic acid crosslinking agent B2:

1,10-decanedicarboxylic acid.

IV—Practical examples

The components were thoroughly mixed and then homogenized in a model PLK 46 co-kneader from Buss AG, Basel. The barrel temperature was 40° C. in the feed zone and 50° C. in the processing section. The kneader shaft was run at 150 rpm. In order to ensure optimum mixing, extrusion was performed twice. The solidified melts were ground with a model ACM 2 classifier mill from Hosokawa-Mikropul, Cologne to yield powder coating compositions having a particle size of <90 μm. The powder coating compositions were sprayed onto degreased steel sheets using an electrostatic cup pistol from ESB. A high voltage of 70 kV(−) was applied during spraying. Hardening was performed within 30 minutes in a gradient oven from Byk at 140° C. and 150° C. Table II shows the composition of the powder coating compositions based on copolymers $A_1$ to $A_7$ and of the comparison coating compositions based on copolymers $V_1$ to $V_4$.

Discussion of results

Coatings obtained from the powder coating compositions of examples 1 to 7 according to the invention have good acetone resistance (even when baked at 140° C. for 30 minutes), combined with increased elasticity and good gloss. When baked at 150° C. for 30 minutes, the acetone resistance of the powder coatings according to the invention was very good. The coatings of comparative examples $V_1$ to $V_3$ have poor acetone resistance at baking temperatures of both 140° C. and 150° C. with the exception of the coating from comparative example $V_4$. However, while this coating did have good and very good acetone resistance at the two cure temperatures, it did not possess good elasticity and did not exhibit the required gloss.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

TABLE II

Composition of the powder coating compositions according to the invention (examples 1–7) and of the comparison powder coating compositions (comparative examples $V_1$–$V_4$); quantities stated in parts by weight.

| Example | 1 | 2 | 3 | 4 | 5 | 6 | 7 | $V_1$ | $V_2$ | $V_3$ | $V_4$ |
|---|---|---|---|---|---|---|---|---|---|---|---|
| Copolymer $A_1$ | 86.4 | | | | | | | | | | |
| Copolymer $A_2$ | | 80.3 | | | | | | | | | |
| Copolymer $A_3$ | | | 81.0 | | | | | | | | |
| Copolymer $A_4$ | | | | 80.3 | | | | | | | |
| Copolymer $A_5$ | | | | | 81.0 | | | | | | |
| Copolymer $A_6$ | | | | | | 77.1 | | | | | |
| Copolymer $A_7$ | | | | | | | 77.1 | | | | |
| Copolymer $V_1$ | | | | | | | | 81.5 | | | |
| Copolymer $V_2$ | | | | | | | | | 76.0 | | |
| Copolymer $V_3$ | | | | | | | | | | 88.3 | |
| Copolymer $V_4$ | | | | | | | | | | | 82.4 |
| Crosslinking Agent $B_1$ | 12.6 | | | | | | | | | | |
| Crosslinking Agent $B_2$ | | 18.7 | 18.0 | 18.7 | 18.0 | 21.9 | 21.9 | 17.5 | 23.0 | 10.7 | 16.6 |
| Levelling Agent* | 1.0 | 1.0 | 1.0 | 1.0 | 1.0 | 1.0 | 1.0 | 1.0 | 1.0 | 1.0 | 1.0 |

*a polyacrylate-based levelling agent (Perenol F 30 P, a commercial product from Henkel)

Test results for powder coating compositions according to the invention (examples 1–7) and for the comparison powder coating compositions (comparison examples $V_1$–$V_4$).

| Example | 1 | 2 | 3 | 4 | 5 | 6 | 7 | $V_1$ | $V_2$ | $V_3$ | $V_4$ |
|---|---|---|---|---|---|---|---|---|---|---|---|
| 1. Baking conditions: 30 minutes, 140° C. | | | | | | | | | | | |
| Ehrichsen indentation (mm) | 9.0 | 7.8 | 9.0 | 8.4 | 7.8 | 8.2 | 8.0 | 4.0 | 9.0 | 8.8 | 2.3 |
| Acetone test* | 0–1 | n.c. | 0–1 | 0–1 | 0–1 | n.c. | n.c. | 2m | 2 | 2m | 0–1 |
| Gloss (20/60°) | 78/98 | 78/99 | 89/106 | 78/105 | 89/105 | 89/107 | 85/104 | 89/106 | 58/97 | 81/102 | 26/69 |
| 2. Baking conditions: 30 minutes, 150° C. | | | | | | | | | | | |
| Erichsen indentation (mm) | 8.9 | 7.8 | 8.7 | 8.3 | 8.0 | 8.4 | 8.1 | 7.5 | 9.0 | 8.7 | 3.4 |
| Acetone test* | n.c. | n.c. | n.c. | n.c. | n.c. | n.c. | n.c. | 2m | 2 | 2m | n.c. |
| Gloss (20/60°) | 73/92 | 80/98 | 89/106 | 81/107 | 75/108 | 88/106 | 85/102 | 91/108 | 58/98 | 82/105 | 31/76 |

*Acetone test: 50 back-and-forth strokes across the substrate surface were made with a saturated cotton wool swab. After a regeneration time of 5 minutes, the exposed area was assessed:
n.c. = no change,
0–1 = surface slightly softened,
2 = film swollen to substrate and
m = matt.

What is claimed is:

1. A powder coating composition, which is suitable for the production of tough, resilient, non-yellowing coatings that are resistant to solvents and chemicals and may be hardened at temperatures of at least 120° C., wherein the composition contains A) a copolymer component consisting essentially of one or more copolymers containing epoxide and anhydride groups and having a glass transition temperature $T_g$ of 30° to 80° C., a number average molecular weight ($M_n$) of 1,000 to 6,000 and a molecular weight distribution, measured as the ratio of the weight average molecular weight to the number average molecular weight ($M_w/M_n$), of 2.5 to 10.0, wherein the copolymers are prepared from
  (i) 4 to 50 parts by weight of (cyclo)alkyl, aryl and/or aralkyl esters of olefinically unsaturated mono- and/or dicarboxylic acids having 1 to 18 carbon atoms in the alcohol or phenol residue,
  (ii) 26 to 45 parts by weight of glycidyl acrylate and/or glycidyl methacrylate,
  (iii) 1 to 8 parts by weight of maleic anhydride and/or itaconic anhydride and
  (iv) 20 to 69 parts by weight of vinyl aromatics,
wherein the sum of the parts by weight of (i) to (iv) is 100, B) a hardener component having a melting point or range of 40° to 160° C. and containing one or more compounds selected from the group consisting of (i) (cyclo)aliphatic dicarboxylic acids having 4 to 20 carbon atoms, (ii) monomeric and/or polymeric anhydrides of such dicarboxylic acids, (iii) polyol-modified polymeric anhydrides of such dicarboxylic acids and (iv) aliphatic hydroxycarboxylic acids having 4 to 18 carbon atoms and C) optionally one or more crosslinking agents in the form of polyaddition products having uretdione groups, wherein components A) and B) are present in an amount such that there are 0.5 to 1.5 carboxyl and/or anhydride groups of component B) for each epoxide group of component A).

2. The powder coating composition of claim 1 wherein said copolymers are prepared from
  (i) 7.5 to 45 parts by weight of (cyclo)alkyl esters of olefinically unsaturated mono- and/or dicarboxylic acids having 1 to 18 carbon atoms in the (cyclo)alkyl residue,
  (ii) 26.5 to 42 parts by weight of glycidyl acrylate and/or glycidyl methacrylate,
  (iii) 1 to 7 parts by weight of maleic anhydride and/or itaconic anhydride and
  (iv) 22 to 65 parts by weight of vinyl aromatics,
wherein the sum of the parts by weight of (i) to (iv) is 100.

3. The powder coating composition of claim 2 wherein component A) consists essentially of one or more copolymers prepared from 10 to 40 parts by weight of component (i), 27 to 40 parts by weight of component (ii), 1 to 6 parts by weight of component (iii) and 25 to 62 parts by weight of component (iv), wherein the sum of the parts by weight of (i) to (iv) is 100.

4. The powder coating composition of claim 1 wherein component B) consists essentially of at least one saturated aliphatic dicarboxylic acid having 4 to 12 carbon atoms.

5. The powder coating composition of claim 2 wherein component B) consists essentially of at least one saturated aliphatic dicarboxylic acid having 4 to 12 carbon atoms.

6. The powder coating composition of claim 3 wherein component B) consists essentially of at least one saturated aliphatic dicarboxylic acid having 4 to 12 carbon atoms.

7. The powder coating composition of claim 1 wherein component B) consists essentially of at least one monomeric and/or polymeric anhydride of an aliphatic dicarboxylic acid having 4 to 12 carbon atoms.

8. The powder coating composition of claim 2 wherein component B) consists essentially of at least one monomeric and/or polymeric anhydride of an aliphatic dicarboxylic acid having 4 to 12 carbon atoms.

9. The powder coating composition of claim 3 wherein component B) consists essentially of at least one monomeric and/or polymeric anhydride of an aliphatic dicarboxylic acid having 4 to 12 carbon atoms.

10. The powder coating composition of claim 1 wherein component B) consists essentially of at least one polyol-modified polyanhydride of an aliphatic dicarboxylic acid having 4 to 12 carbon atoms and containing acid anhydride and carboxyl groups in a molar ratio of 1:1 to 3:1.

11. The powder coating composition of claim 2 wherein component B) consists essentially of at least one polyol-modified polyanhydride of an aliphatic dicarboxylic acid having 4 to 12 carbon atoms and containing acid anhydride and carboxyl groups in a molar ratio of 1:1 to 3:1.

12. The powder coating composition of claim 3 wherein component B) consists essentially of at least one polyol-modified polyanhydride of an aliphatic dicarboxylic acid having 4 to 12 carbon atoms and containing acid anhydride and carboxyl groups in a molar ratio of 1:1 to 3:1.

13. A coated heat-resistant substrate prepared from the powder coating composition of claim 1.

14. An automotive clear coat prepared from the powder coating composition of claim 1.

* * * * *